F. HENZELMAN.
RETAINER FOR BALL AND ROLLER BEARINGS.
APPLICATION FILED AUG. 16, 1910.
996,985. Patented July 4, 1911.
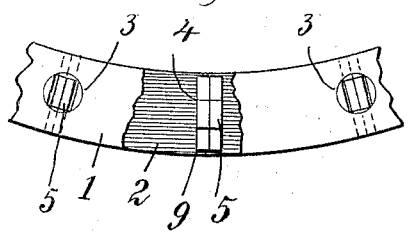
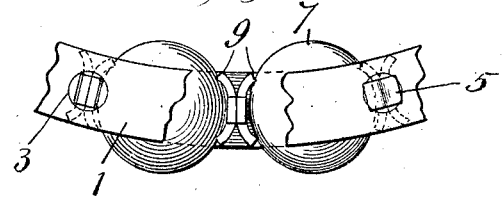
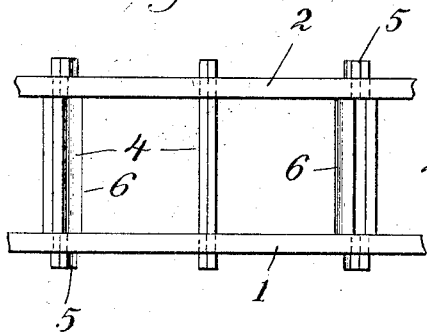
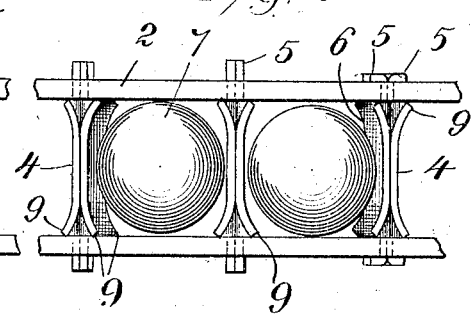
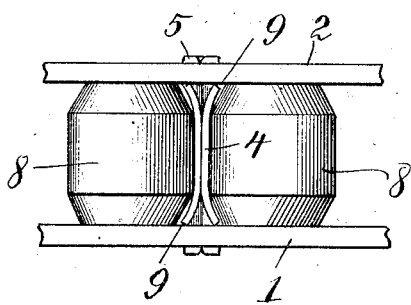
Witnesses:
H. R. L. White
R. A. White
Inventor:
Fritz Henzelman
By Robt. Klotz, Atty.

UNITED STATES PATENT OFFICE.

FRITZ HENZELMAN, OF CHICAGO, ILLINOIS, ASSIGNOR, BY DIRECT AND MESNE ASSIGNMENTS, TO GERMAN AMERICAN BALL BEARING MFG. CO., OF CHICAGO, ILLINOIS, A CORPORATION.

RETAINER FOR BALL AND ROLLER BEARINGS.

996,985.  Specification of Letters Patent.  Patented July 4, 1911.

Application filed August 16, 1910. Serial No. 577,464.

*To all whom it may concern:*

Be it known that I, FRITZ HENZELMAN, a citizen of the United States, and residing at Chicago, in the county of Cook and State of Illinois, have invented a new and useful Improvement in Retainers for Ball and Roller Bearings, of which the following is a complete specification.

The main objects of this invention are to provide a retainer for bearings in which either balls or rollers may be employed without changing or altering the construction; to provide a retainer for either ball or roller bearings which is of very cheap and simple construction and not liable to get out of repair; and to provide a retainer in which the spacers are so formed that they will carry either balls or rollers of the same diameter, and permit the removal or insertion of the balls or rollers without injuring or destroying the retainer.

A specific construction embodied in said invention is illustrated in the accompanying drawings, in which:

Figure 1 is a fragmentary, side elevation of the retainer with the parts assembled but before the spacer plates are curved or dished and secured in place. Fig. 2 is a fragmentary, side elevation of the retainer with the spacer plates dished and partly secured in place, and with balls between the spacers. Fig. 3 is a plan view of the construction shown in Fig. 1. Fig. 4 is a plan view of the construction shown in Fig. 2. Fig. 5 is a fragmentary, plan view of the retainer with rollers therein.

In the construction shown, there are two annular retaining members or rings 1 and 2, which are flattened in planes transversely of their axes, and each is provided at regular intervals with apertures 3 which register with like apertures in the other ring and in which the spacers are secured. Each spacer comprises a pair of oppositely facing spacer plates 4, and there is a pair of plates secured in each pair of registering apertures 3 in said rings, or in other words there is a pair of spacer plates between each two adjacent balls or rollers. Each spacer plate comprises a flat strip of metal of a width approximately equal to the width of the rings 1 and 2 and of a length to fit between the rings and hold them the desired distance apart. On each end of each plate 4 is a lug 5, which lugs are adapted to extend through the apertures 3 and to be bent laterally on the outer sides of the rings to hold the plates in place. Preferably the lugs 5 of each plate are bent oppositely from those of the other plate of the same spacer. Said plates set in planes coinciding with the radii of the rings, so that their inner edges 6 are closer together than their outer edges, and prevent the balls 7 or rollers 8 from passing therebetween, while permitting said balls or rollers to enter between the outer edges and lie in the interstices or pockets between the spacers. Each spacer plate 4 has its corners 9 turned inwardly toward the adjacent ball or roller, so that the plate is dished or cup shaped on its face adjacent to the ball or roller.

From the foregoing description it will be seen that each spacer comprises a pair of plates which are cupped or dished on their opposite faces to receive the balls or rollers.

While but one specific embodiment of my invention has been herein shown and described, it will be understood that many details of the construction shown may be varied or omitted without departing from the scope of the invention.

I claim:

A retainer for ball and roller bearings, comprising a pair of rings having a plurality of registering apertures therein, a plurality of pairs of spacer plates between said rings, and the plates of each pair having their corners turned oppositely, and lugs on the ends of said plates adapted to be secured in said apertures.

In testimony whereof I have hereunto subscribed my name in the presence of two witnesses.

FRITZ HENZELMAN.

Witnesses:
 RICHARD A. SCHULTZ,
 EMIL MERKS.